United States Patent [19]
Mathes

[11] 3,765,583
[45] Oct. 16, 1973

[54] FILM ADVANCING MECHANISM FOR PRECISELY POSITIONING A PERFORATED WEB

[75] Inventor: Alva F. Mathes, Rochester, N.Y.

[73] Assignee: Eastman Kodak Company, Rochester, N.Y.

[21] Appl. No.: 249,329

[52] U.S. Cl............................ 226/36, 226/60, 226/67, 226/123, 226/116
[51] Int. Cl............................................ B65h 23/16
[58] Field of Search...................... 226/123, 36, 67, 226/70, 62, 60, 116

[56] References Cited
UNITED STATES PATENTS

| | | | |
|---|---|---|---|
| 2,694,974 | 11/1954 | Briggs............................. | 226/67 X |
| 1,403,106 | 1/1922 | Pittman........................... | 226/67 |
| 1,621,334 | 3/1927 | Reichmann...................... | 226/67 X |
| 3,118,358 | 1/1964 | Marjoram........................ | 226/123 X |
| 3,371,834 | 3/1968 | Willits et al...................... | 226/36 X |

Primary Examiner—Allen N. Knowles
Attorney—William T. French et al.

[57] ABSTRACT

A film advancing mechanism for advancing a film containing perforations to a precise final position at an operating station, such as a splicing station. The film is initially transported by a suitable transport mechanism to an initial position in which it is located approximately .010 to .40 inches short of the precise final position. The film advancing mechanism advances the film from the initial position to within substantially plus or minus .005 inch of the final position.

8 Claims, 3 Drawing Figures

FILM ADVANCING MECHANISM FOR PRECISELY POSITIONING A PERFORATED WEB

BACKGROUND OF THE INVENTION

1. Field of the Invention

This invention relates generally to film transport mechanisms, and more specifically to a film advancing mechanism for advancing a film from an initial position to a precise final position at an operating station.

2. Description of the Prior Art

Commercial film processing systems generally utilize one or more film processing devices through which exposed film is fed in sequence through a series of operation performing stations, including developing, fixing, washing and drying stations. In such processing systems, the film processing devices are often set up to operate continuously. This necessitates feeding a continuous film into the processing device, such film being formed by opening cassettes or cartridges containing strips of customers' film, and splicing the film-strips together. The continuous film may be fed directly into the processing device, or wound onto a master roll for subsequent splicing and feeding into a slack box and from the slack box into the processing device. Since the exposed film is susceptible to fogging by light, the latter operations are performed in substantial darkness. In those situations where the film is perforated, such as motion picture film having equidistantly spaced perforations of a contant pitch, it is important prior to a splicing operation that the leading and trailing ends of two adjacent film strips be precisely positioned so that the last or end perforations in the film ends are spaced apart a distance substantially equal to the pitch of the remaining perforations. Such accurate spacing of perforations is desirable for operations such as printing, slitting, or the like, in which the continuous strip is fed by a sprocket in driving engagement with the perforations. If such spacing is not accurate, jamming of the film may occur resulting in possible damage to the film. In addition, inaccurate performance of subsequent operations on the film, and increased machine down time is likely. This objective of accurately spacing the film ends for splicing with the end perforations spaced apart a distance substantially equal to the pitch of the remaining perforations is achieved by a film advancing mechanism in accordance with this invention, which substantially eliminates the above-mentioned and other disadvantages of a continuous film having inaccurately spaced perforations at the film ends where the two are spliced together.

SUMMARY OF THE INVENTION

In accordance with a preferred embodiment of the invention, a film advancing mechanism is provided for advancing an end of a perforated web to a precise final position. In another embodiment, the leading and trailing ends of two aligned, perforated filmstrips are advanced by a pair of film advancing mechanisms to precise final positions, in which the distance between the last or end perforations of the strips at a splicing station is substantially equal to the pitch of the other film perforations. The leading and trailing film ends are initially transported by suitable transport means to an initial position short of the final position by, for example, 0.010 to 0.040 inches. The film positioning mechanisms then advance film ends from their initial position to the final position. In one embodiment, the film advancing mechanism comprises a finger positioned above the film and guided by a cam slot initially generally downwardly into a film perforation, and then forwardly substantially parallel to the film for advancing the film from its initial position to its final position. The end of the slot forms a shoulder or surface which stops further advance of the finger and film with the film end located precisely at the final position within substantially plus or minus 0.005 of an inch. In an additional feature, a dashpot is coupled to the finger to reduce the impact of the finger with the edge of the perforation, and hence prevent damage thereto.

It is accordingly one of the objects of the present invention to provide an improved film advancing mechanism for advancing the end of a perforated film to a precise position at an operating station.

Another object of the invention is to provide a film advancing mechanism for advancing each of two perforated film ends in spaced apart, aligned relation for splicing or the like with the end perforations in the film ends being spaced apart a distance substantially equal to the pitch of the other film perforations.

Another object of the invention is to provide a film advancing mechanism that is of simple design and construction, thoroughly reliable and efficient in operation, and economical to manufacture.

The invention and its objects and advantages will become more apparent from the detailed description of the preferred embodiment presented below.

BRIEF DESCRIPTION OF THE DRAWING

In the detailed description of the preferred embodiment of the invention presented below, reference is made to the accompanying drawing, in which.

DESCRIPTION OF THE PREFERRED EMBODIMENT

Because film splicing apparatus including film transport mechanisms are well known, the present description will be directed in particular to elements forming part of, or cooperating more directly with apparatus in accordance with the present invention. Film splicing and transport mechanisms or elements not specifically shown or described herein should be understood to be selectable from those known in the art.

Figure 1:
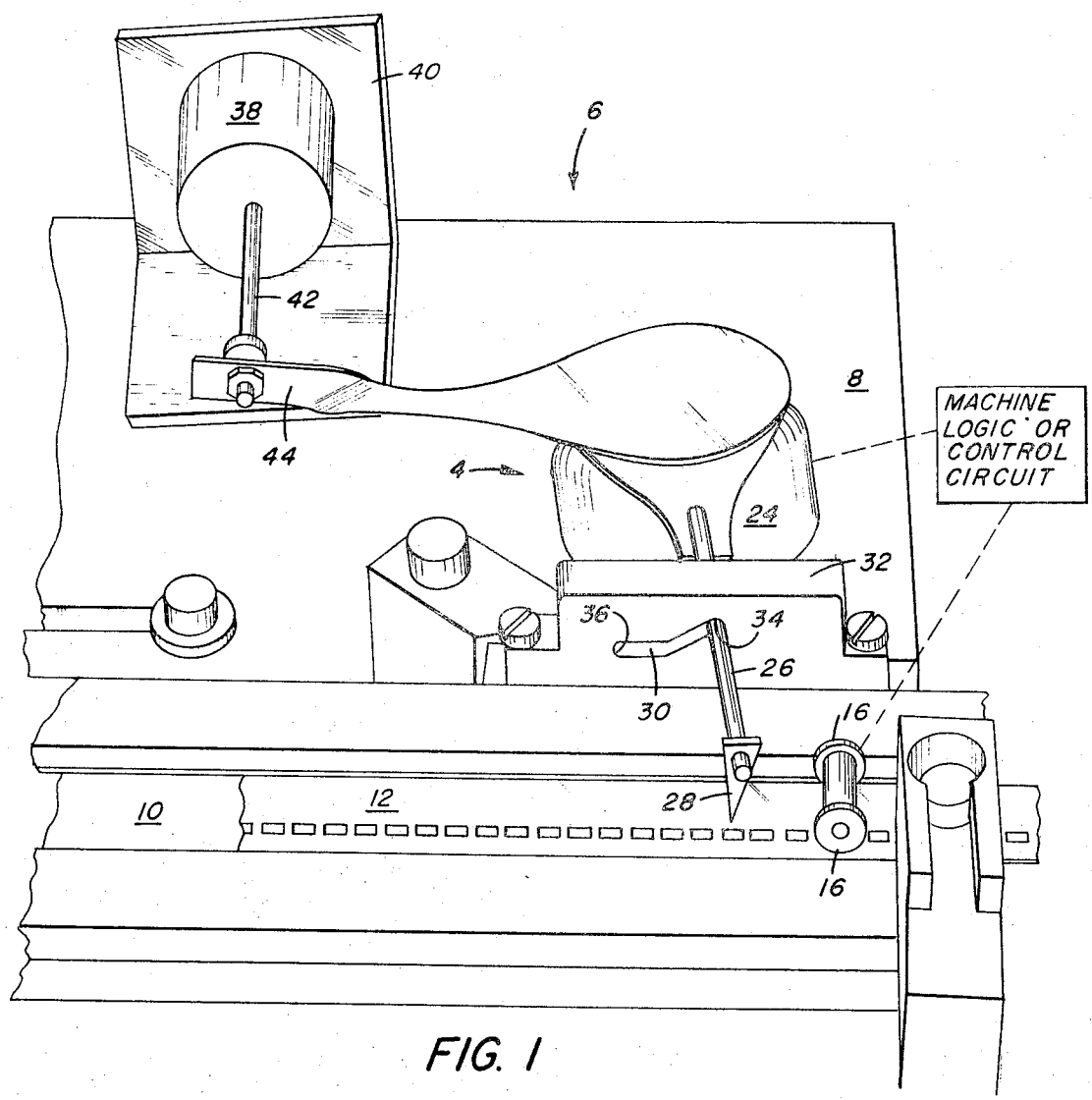
FIG. 1 is a perspective view illustrating a preferred embodiment of a film strip advancing mechanism in accordance with this invention.
Figure 2:
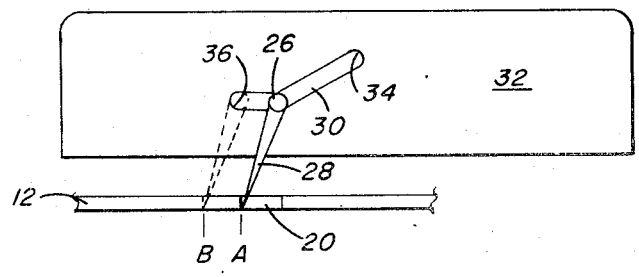
FIG. 2 is a fragmentary side elevational view illustrating the initial position of a film advancing finger within a perforation in a full lines, and its final position in dotted lines.
Figure 3:
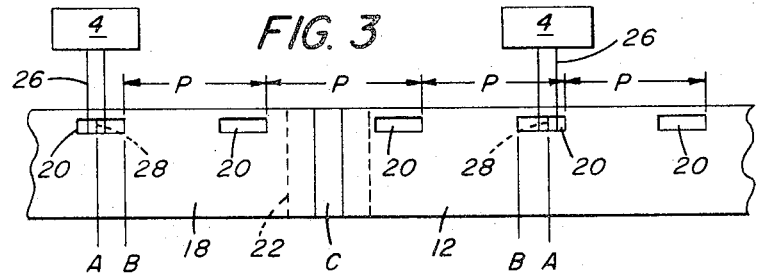
FIG. 3 is a top plan view showing a pair of film-strip ends in their final position, and splice tape in dotted lines overlying the ends for securing the filmstrips together.

A film advancing mechanism 4 in accordance with the invention is illustrated for use in a film splicing device 6 having a base 8, and a film track 10 on the base along which a film end 12 is transported by any suitable transport mechanism. For example, the transport mechanism may comprise a feed roller 14 having spaced apart, peripheral rubber tires 16 in driving engagement with the edges of the perforated film, and controlled for operation by any suitable machine control circuit. Although only one film advance mechanism 4 is illustrated in FIG. 1 for advancing the end of one film to a precise final position at a splicing station generally designated C (FIG. 3), a similar film advancing mechanism is provided at the opposite side of splicing station C, as illustrated schematically in FIG. 3, for advancing the end of another film 18 to a precise final position at splicing station C. When so positioned, the two film ends 12, 18 are in spaced apart, aligned relation ready for splicing. The feed roller 14 and related apparatus, not shown, of the film transport mechanism is operated by the machine control circuit to initially transport each of the film ends 12, 18, shown exaggerated in FIGS. 2 and 3, to an initial position A with the film ends and perforations 20 located, for example 0.010 to 0.040 inches short of a final position B. The film advancing mechanisms 4 are operated by the machine control circuit in timed relation to the film transport mechanism for engaging the film ends 12, 18 and advancing them to their final positions B with the film end perforations 20 positioned within substantially plus or minus 0.005 inches of the required final position B as seen in FIG. 3. In this final position of the film ends, the pitch of the end film perforations 20 at the splicing station is substantially equal to the normal pitch P of the other filmstrip perforations. A splicing apparatus of any suitable type, not shown, is operated to apply a splicing tape 22, shown dotted in FIG. 3, across the film ends 12, 18 for splicing the filmstrips together to form a continuous film.

As shown in FIG. 1, each of the film advancing mechanisms 4 comprises a rotary solenoid 24 of known type mounted for rotatable and pivotal movement on base 8 of the splicing device adjacent film track 10. A rod-like arm 26 has one end secured by any suitable means to the rotatable part of solenoid 24, and has a depending finger 28 at the other end. The intermediate portion of arm 26 extends through a cam slot 30 in a bracket 32 secured to base 8, and in the normal position of solenoid 24, arm 26 is at the upper end 34 of slot 30 as best seen in FIG. 1. In this position, the end of finger 28 is positioned approximately .125 inches above the surface of the film. When rotary solenoid 24 is energized by the machine control circuit, arm 26 travels down the inclined portion of slot 30 moving the end of the finger downwardly at an angle relative to the film into a film perforation 20 as best seen in FIG. 2. The remainder of slot 30 is substantially parallel to film 12, and hence further forward travel of arm 26 causes finger 28 to advance the film along film track 10 to a final posiion B when finger 28 butts up against shoulder 36 formed by the lower end of slot 30. In this precise final position B, the end perforations 20 in the leading and trailing film ends 12, 18 are spaced apart a distance substantially equal to the normal pitch P of the other perforations as seen in FIG. 3. In order to prevent damage to the edge of a perforation 20 when engaged by finger 28 traveling at high speed, a dashpot 38 of known type is secured to a bracket 40 mounted on base 8, and has an operating rod 42 coupled to an arm 44 secured by any suitable means to the rotatable part of solenoid 24.

The invention has been described in detail with particular reference to a preferred embodiment thereof, but it will be understood that variations and modifications can be effected within the spirit and scope of the invention as described hereinabove.

I claim:

1. In a mechanism for advancing the end portion of a web of the type containing equidistantly-spaced perforations to a precise final position, the combination comprising:
   web transport means for transporting the web to an initial position short of the final position;
   web advancing means for advancing the web from said initial position to said final position, said web advancing means comprising an arm having a depending finger, a rotary solenoid coupled to said arm, and cam means having a first cam surface for guiding said finger into guiding engagement with a web perforation, a second cam surface for retaining said finger in engagement with said web perforation as said web is moved by said finger, and a stop surface in the path of said arm for preventing further advance of said finger and web when said web end portion reaches said final position; and
   control means coupled to said web transport and advancing means for operating said web transport and advancing means in timed relation whereby said web transport means transports said web end portion to said initial position, and said web advancing means advances said web end portion from said initial position to said final position.

2. The invention according to claim 1 wherein said web advancing means further comprises damping means for said rotary solenoid for damping the movement of said finger so that the edge of the web perforation is not damaged upon engagement therewith.

3. In a mechanism for advancing the end portion of a web of the type containing equidistantly-spaced perforations from an initial position to a precise final position, the combination comprising:
   web advancing means normally out of engagement with a web and reciprocally movable longitudinally of said web; and
   cam means for controlling said web advancing means and having a first cam surface for guiding said web advancing means into driving engagement with a web perforation, a second cam surface continuous with said first cam surface for retaining said web advancing means into engagement with said web perforation as said web is moved by said transport means, and a stop surface defined by said second cam surface in the path of said web advancing means for preventing further advance of said web advancing means and web when said web end portion reaches said final position.

4. The invention according to claim 3 wherein said web advancing means comprises an arm having a depending finger.

5. The invention according to claim 3 wherein said web advancing means comprises an arm having a depending finger, and a rotary solenoid coupled to said arm.

6. The invention according to claim 3, and further including means coupled to said web advancing means for damping the movement of said web advancing means so that the edge of said perforation is not damaged upon engagement therewith.

7. The invention according to claim 3 wherein said first cam surface is an inclined surface at an angle to said web, said second cam surface is substantially parallel to said web, and said stop surface is substantially perpendicular to said web.

8. The invention according to claim 3 wherein said web advancing means comprises an arm having a depending finger, a rotary solenoid secured to said arm, and said invention further includes damping means for said rotary solenoid comprising a lever having one portion thereof secured to said rotary solenoid, and a dashpot secured to another portion of said lever.

* * * * *